United States Patent [19]

Ritter et al.

[11] Patent Number: 4,464,479

[45] Date of Patent: Aug. 7, 1984

[54] METHOD FOR TREATING RED MUD

[75] Inventors: Günter Ritter, Brühl; Uwe Lenz, Frechen; Paul Lazik, Cologne, all of Fed. Rep. of Germany

[73] Assignee: Rheinische Braunkohlenwerke AG, Cologne, Fed. Rep. of Germany

[21] Appl. No.: 488,929

[22] Filed: Apr. 27, 1983

[30] Foreign Application Priority Data

Apr. 28, 1982 [DE] Fed. Rep. of Germany ....... 3215727

[51] Int. Cl.³ .................... B01J 21/18; B01J 31/02; C10G 1/06
[52] U.S. Cl. .................... 502/185; 502/150; 208/210
[58] Field of Search .................. 208/10; 252/430, 447; 502/150, 185

[56] References Cited

U.S. PATENT DOCUMENTS

| 3,018,241 | 1/1962 | Gorin | 208/10 X |
|---|---|---|---|
| 3,775,286 | 11/1973 | Mukherjee et al. | 208/10 |
| 4,038,172 | 7/1977 | Ueda et al. | 208/10 |
| 4,169,038 | 9/1979 | Metrailer et al. | 208/10 |
| 4,176,041 | 11/1979 | Mori et al. | 208/10 |
| 4,303,497 | 12/1981 | Mitchell et al. | 208/10 |

FOREIGN PATENT DOCUMENTS 0672611  3/1939  Fed. Rep. of Germany .

Primary Examiner—Delbert E. Gantz
Assistant Examiner—William G. Wright
Attorney, Agent, or Firm—Seidel, Gonda & Goldhammer

[57] ABSTRACT

In order to improve the handling capability of red mud, it is mixed with fine-grain coal material such as brown coal or lignite in dust form, in a ratio by weight of between 0.5–10:1. The liquid present in the red mud is bound by the very fine coal admixed therewith so that the resulting mixture can be stored in a silo and even pneumatically conveyed, and the oily properties of the red mud are removed by the treatment. The mixture is particularly suitable for use in connection with the hydrogenating liquefaction of coal in which the red mud is used as a catalyst.

19 Claims, 1 Drawing Figure

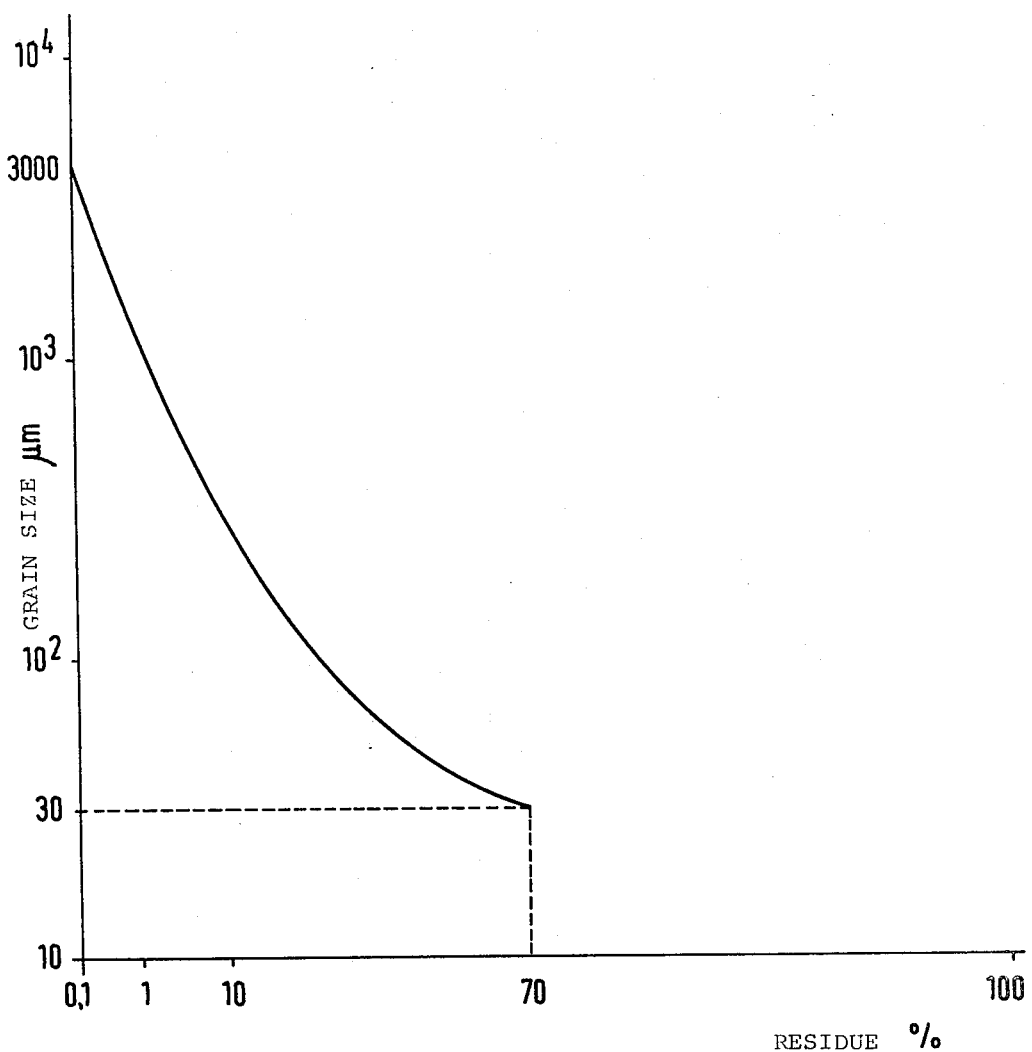

4,464,479

METHOD FOR TREATING RED MUD

BACKGROUND OF THE INVENTION

The present invention relates generally to a method of treating red mud, to permit it more readily to be put to further uses.

Red mud is a waste product which is produced in the manufacture of aluminium. The starting material bauxite which includes inter alia iron and aluminium oxide is digested with caustic soda or soda at elevated temperatures. In the course of the process, aluminium is dissolved, while iron oxide ($Fe_2O_3$; $Fe_3O_4$) and other solid materials present remain in finely divided form in an alkaline aqueous suspension. The suspension is then filtered at temperatures of about 70° C., for example on a drum-type filter. In that operation, the red mud is deposited on the drum filter cloth, from which it is stripped or scraped off. Generally, the arrangement is such that the red mud then drops into a collecting channel which is disposed under the drum filter and which is flushed through with water so that the red mud undergoes further dilution and can be conveyed to a waste dump by way of a pipeline. This means that the red mud is normally treated as a waste product. However, there is also a restricted number of uses to which red mud can be put, for example as a catalyst in the hydrogenation of coal, a process that requires the presence of a catalyst for accelerating the hydrogenating reaction. However, the use of red mud has hitherto been subject to certain limitations, which is essentially to be attributed to the fact that it is very difficult to handle. That is because on the one hand, red mud represents an oily dirty product, and also in particular depending on the conditions of transportation and handling, there may be the danger of further compacting of the solid substance therein, more specifically also in the sense of partial separation of the solid phase from the liquid phase, with the result that an alkaline aqueous phase is separated off. That requires particular measures to be taken in order to safeguard it, for example to prevent it from uncontrolledly running out or leaking for example from a transportation container or the like. Consequently, a procedure which has been adopted is that of drying the red mud before it is put to further use.

Red mud usually has a water content of between 40 and 60%, which can be removed by the application of heat, but such a drying process requires additional and generally complicated equipment, and also involves the consumption of a large amount of energy.

SUMMARY OF THE INVENTION

An object of the present invention is to provide a method of treating red mud so that it is easier to handle and transport.

Another object of the invention is a method of treating red mud to permit it to be readily put to subsequent uses, with a low level of energy consumption and comparatively inexpensive and uncomplicated apparatus, as well as with a readily available material.

A further object of the present invention is to provide a red mud treated so as to permit further use thereof, with at least no substantial restriction in the usability thereof.

These and other objects are achieved by a method wherein the red mud, with a moisture content of between about 40 and 60% by weight, is mixed with a sufficient amount of fine coal material. In particular the coal material may be in the fine form of coal dust, or may comprise coke or a mixture of coal and coke, the amount used being sufficient to dry and bind the red mud to make it handleable.

It is particularly advantageous for the operation of admixing the coal dust to be carried out directly after the red mud has been separated from the filter in the above-mentioned operation of separating the red mud from the suspension, as at that moment, the consistency of the red mud is suitable for the mixing operation, being from a slurry-like consistency to a pasty consistency, and therefore being of comparatively low viscosity. As mentioned above, the water content of the red mud is substantially from 40 to 60% by weight. As its temperature decreases, the consistency of the red mud changes so that the red mud becomes more viscous again and takes on a clay-like consistency. It has been found that, upon being treated with coal dust, the red mud at least virtually completely loses its oily properties and that the result is a grainy mixture which can be easily handled and transported, with the liquid in the red mud being found by the fine coal material. A particularly advantageous aspect of this method is that that mixture can be produced using comparatively simple, low-speed mixers, and the resulting mixture can even be stored in silos over a prolonged period of time, and can also be conveyed pneumatically.

The use of very fine-grain brown coal or lignite has been found to be particularly advantageous in this method. It should be noted at this point that the terms 'brown coal' and 'lignite' are used interchangeably in this specification and a reference to brown coal is intended to include lignite and vice-versa. The advantage attained by using brown coal or lignite, particularly in dust form, is essentially to be attributed to the fact that, by virtue of its large internal surface area, brown coal or lignite is capable of binding comparatively large amounts of moisture. That is the case even when the brown coal or lignite dust used still has a substantial water content, for example of the order of magnitude of from 10 to 15%. The water inherent in the brown coal or lignite is bound in colloidal form at least for a substantially predominant proportion thereof so that it makes little or no contribution to the overall moisture content of the resulting mixture comprising red mud and brown coal or lignite dust. There is therefore no necessity for the brown coal or lignite to be dried to a particularly low water content, in order to achieve the desired effect. On the contrary, the method according to the invention can be performed using a brown coal or lignite fraction which is available in any case when brown coal or lignite is subjected to the usual handling and processing operations, wherein the residual water content thereof will be dependent on the crushability or grindability of the coal—if a crushing or grinding operation should be required—rather than on the moisture content of the resulting mixture. It will be seen therefore that the method of treating red mud uses a readily available material.

The amount of coal dust required for drying the red mud is comparatively small. It has been found that red mud with brown coal or lignite in a ratio of 0.5–10:1 by weight gave satisfactory results. Preferably, the ratio by weight between the red mud and the coal is 1:1. The mixing ratio will also depend on the moisture content of the red mud so that less coal has to be mixed with a red mud which has a low moisture content, and vice-versa.

Instead of coal dust, it is also possible to use very fine-grain coke or a mixture of coke and coal. In this case also, the large internal surface area of the coke is thought to contribute to the desired effect of binding the moisture of the red mud.

It has already been mentioned that, when using brown coal or lignite dust, such dust is generally subjected to a drying operation. The extent to which that is required when the coal used for binding the red mud is bituminous or hard coal will essentially depend on the manner of mining thereof. Dust which is separated out in a sifter, that is to say, in a dry condition, will generally not require any drying operation. In contrast, when dealing with very fine bituminous or hard coal which has been dewatered on filters, it may also be necessary further to reduce the moisture content, by thermal drying.

The above-mentioned mixture formed between red mud and for example fine-grain brown coal or lignite which has been dried to a residual moisture content of 12% was found to be highly suitable for example for the hydrogenating treatment of brown coal or lignite for the purposes of liquefaction thereof. In the hydrogenating liquefaction of brown coal or lignite, the amount of brown coal or lignite dust to be used for drying the red mud is relatively low, in comparison with the total amount of brown coal or lignite to be used. Thus, from 2 to 5% of the total amount of coal to be hydrogenated is required for mixing with the red mud, in the form of brown coal or lignite dust. In this case, it has been found for example highly advantageous for the method of treating the red mud with the brown coal dust to be carried out at the location at which the red mud is produced, so that there is no need to transport untreated red mud to the region of the hydrogenating installation, thereby avoiding contamination and similar difficulties. An important consideration in this connection is the advantage which can generally be attained when using the method of the invention, namely that the water contained in the resulting red mud-coal mixture remains bound in any case in the further handling of the mixture, which fact permits the mixture for example to be stored in silos, as mentioned above.

Red mud and brown coal or lignite dust can be mixed in different mixing equipment. Favourable results were achieved for example when a fluid mixer, the speed of rotation of which can be controlled, thereby permitting the grain size of the mixed material to be influenced insofar as the grain size will generally decrease, with increasing mixing speed. That effect can also be enhanced by including additional fluidisation blades or vanes in the mixing apparatus.

It is also possible however to use low-speed mixing devices, for example counter-flow mixers or mixing-kneading installations. Depending on the consistency of the red mud produced, it may be necessary to give preference to one kind of mixing apparatus or the other, or to the centrifuging mixing method or the mixing kneading method. The brown coal or lignite dust is usually continuously admixed with the red mud, although it may be more desirable for the brown coal or lignite dust to be added to the red mud in a stepwise or batch manner or for example in two batches or steps.

The mixing installations may possibly be additionally heated from the exterior, in order on the one hand to promote the mixing operation and on the other hand to produce an additional drying effect. As is known, red mud has thixotropic properties, with the result that, when mechanically worked, it changes from its pasty condition into a more or less fluid condition. Applying heat from the outside for example will promote the change into the fluid condition, with the result that mixing thereof with the brown coal or lignite dust is improved and facilitated.

The above-mentioned possibilities of the red mud-coal mixture being stored in silos over a prolonged period of time and possibly conveyed pneumatically over long distances permit the mixture to be transported into the region of the definitive location of use thereof. There is no doubt that applying the teaching according to the present invention opens up further areas of use of red mud, over and above the above-mentioned use thereof as a catalyst in the hydrogenation of coal. It has been found that in general the amount of energy consumed and the expenditure on processing equipment can be kept at a low level, and the usability of the red mud does not experience any restriction, or any restriction of substance, by virtue of the red mud being treated by the method of the invention.

Further features and advantages of the method of the invention will be apparent from the following description of an embodiment thereof, given by way of example.

DESCRIPTION OF PREFERRED EMBODIMENTS

Red mud which contained 5% by weight of $Fe_2O_3$ and about 55% by weight of water was mixed with brown coal or lignite dust having a moisture content of 12% (referred to herein as DBC 12), in a ratio of 1:1 by weight. The mixing time was 10 to 20 minutes. A mixing time of 10 minutes produced just adequate mixing, whereas with a mixing time of 20 minutes, the resulting product was noticeably finer-grained. The mixing temperature was between 70° and 100° C. Mixing was effected in different mixing apparatuses and at different speeds of rotation. The resulting product was a crumbly or friable mixture of red mud and brown coal or lignite dust which was dry in appearance and which was subjected to screen or sifting analysis. The result thereof is set out in the Table.

Tests 1 and 2 involved using a fluid mixer, produced by Henschel, for the mixing operation. The mixing speeds, of 1600 $min^{-1}$, were comparatively high. Test 3 involved using a counter-flow mixer, produced by Eirich, which comprises a rotating agitator mechanism and a slow-speed mixing plate which rotates in the opposite direction to the direction of rotation of the agitator mechanism. Test 4 involved using a ploughshare-type mixer, produced by Lödige, which produces centrifuging and vortex or eddy mixing effects. That mixer, at a speed of 300 $min^{-1}$, was already operating at a higher speed than the mixer used in Test 3.

Test 5 was performed on a mixing-kneading installation, produced by Buss, operated at a rotary speed of 30 to 60 $min^{-1}$. In that installation, the kneading housing and the kneading screw of the installation are formed as a continuously operating assembly, and the rotor performs rotary and axial movements.

With regard to the grain size of the mixtures produced, the values obtained in Tests 1, 2 and 5 were clearly below the main grain size diameters of Tests 3 and 4. The situation is similar in regard to bulk density values. It was also found here that the crushing process was taken to a less advanced stage under the conditions of Tests 3 and 4 than under the conditions of Tests 1, 2 and 5. On the other hand, there were not such clear differences between the individual test results, in regard to the water content of the resulting mixtures. That was also not to be expected.

DESCRIPTION OF THE DRAWING

The result of all tests is also shown on average in the attached diagram in which the grain size of the mixed material or the mesh width of the measuring sieve or screen is indicated by way of the residue on the screen. Both axes are logarithmically subdivided. The result obtained was a mean curve of approximately hyperbolic configuration.

The above-described tests were such as clearly to demonstrate that red mud and brown coal or lignite dust can be mixed together to form a hanldeable product which is particularly suitable for the purposes of catalysis in the hydrogenating liquefaction of brown coal or lignite. Comparable results were obtained when red mud was treated, by way of testing, with bituminous or hard coal dust.

TABLE

Mixtures: Brown coal or lignite dust (DBC 12)
Red mud (30 to 40% by weight $Fe_2O_3$, $Fe_3O_4$)
Mixing ratio: 1:1 by weight
Mixing tire: 10 to 20 minutes
Mixing temperature: 70 to 100° C.

Screen analysis

| | Tests | | | | |
|---|---|---|---|---|---|
| | 1 | 2 | 3 | 4 | 5 |
| | rotary speed | | | | |
| Grain size m $10^{-6}$ | 1600 $min^{-1}$ | 1600 $min^{-1}$ | 53 $min^{-1}$ | 300 $min^{-1}$ | 50 $min^{-1}$ |
| 2000 | 0.2 | — | 1.98 | 0.41 | 0.12 |
| 2000–1000 | 0.34 | 0.13 | 1.25 | 4.08 | 1.40 |
| 1000–500 | 2.75 | 0.71 | 2.74 | 1.48 | 0.83 |
| 500–315 | 5.01 | 2.07 | 3.39 | 1.54 | 2.31 |
| 315–200 | 10.99 | 7.87 | 8.63 | 8.94 | 6.37 |
| 200–125 | 11.95 | 11.69 | 13.03 | 15.70 | 10.40 |
| 125–90 | 6.56 | 8.25 | 7.44 | 9.03 | 7.06 |
| 90–63 | 5.80 | 9.13 | 9.42 | 9.91 | 8.34 |
| 63–50 | 4.54 | 6.43 | 8.59 | 8.58 | 6.11 |
| 50–40 | 1.86 | 3.04 | 7.09 | 6.66 | 4.50 |
| 40–32 | 6.43 | 7.23 | 13.69 | 11.67 | 11.47 |
| 32 | 43.65 | 43.45 | 22.75 | 22.00 | 41.09 |
| Mean grain size μm | 120.9 | 93.6 | 178.5 | 176.7 | 102.6 |
| Bulk density g $cm^{-3}$ | 0.654 | 0.640 | 0.771 | 0.690 | 0.527 |
| Water content of the mixture % by weight | 23.4 | 24.6 | 27.9 | 23.4 | 26.6 |

What is claimed is:

1. A method of treating red mud to improve its transportability and storability wherein the red mud with a moisture content of between 40 and 60% by weight is mixed with a sufficient amount of fine coal material to form a granular mixture.

2. A method as set forth in claim 1 wherein the coal material is in dust form.

3. A method as set forth in claim 1 wherein the coal material includes coke.

4. A method as set forth in claim 1 wherein the coal material is very fine-grain brown coal.

5. A method as set forth in claim 1 wherein red mud is mixed with coal material in a ratio of between 0.5 to 10 parts by weight of red mud to 1 part by weight of coal material.

6. A method as set forth in claim 5 wherein said ratio is 1:1.

7. A method as set forth in claim 4 wherein the brown coal is pre-dried to a moisture content of less than about 20% prior to mixing the red mud and brown coal.

8. A method as set forth in claim 7 wherein the moisture content of the brown coal prior to mixing is substantially 12%.

9. A method as set forth in claim 1 wherein the coal material is continuously admixed with the red mud.

10. A method as set forth in claim 1 wherein the coal material is admixed with the red mud in a stepwise manner.

11. A method as set forth in claim 10 wherein the coal material is added in two steps.

12. A method as set forth in claim 1 wherein the step of mixing the red mud and the coal material is effected in a controllable speed mixer, and wherein the operating speed of the mixer is regulated to produce a given grain size in the red mud-coal mixture produced.

13. A method as set forth in claim 1 wherein the red mud is mixed with the coal material in a counter-flow mixer.

14. A method as set forth in claim 1 wherein the red mud is mixed with the coal material in a mixing-kneading apparatus.

15. A method as set forth in claim 1 wherein the red mud mixed with the coal material is put into storage in a silo before further use thereof, for pneumatic discharge from the silo and conveying to the location of use.

16. A method of treating red mud to improve its transportability and storability comprising mixing the red mud with a sufficient amount of fine coal material to form a granular mixture consisting essentially of red mud and fine coal material.

17. The mixture as set forth in claim 16 wherein the ratio of the red mud by weight to the fine coal material by weight is about 1:1.

18. A mixture consisting essentially of red mud and fine coal material, the amount of said red mud being between 0.5 to 10 parts by weight to 1 part by weight of said coal material.

19. Granules comprising red mud and fine coal material. The amount of said red mud being 0.5 to 10 parts by weight to 1 part by weight of said coal material.

* * * * *